July 29, 1947.　　　　　M. DACH　　　　2,424,879
AIR TANK
Filed Aug. 5, 1944
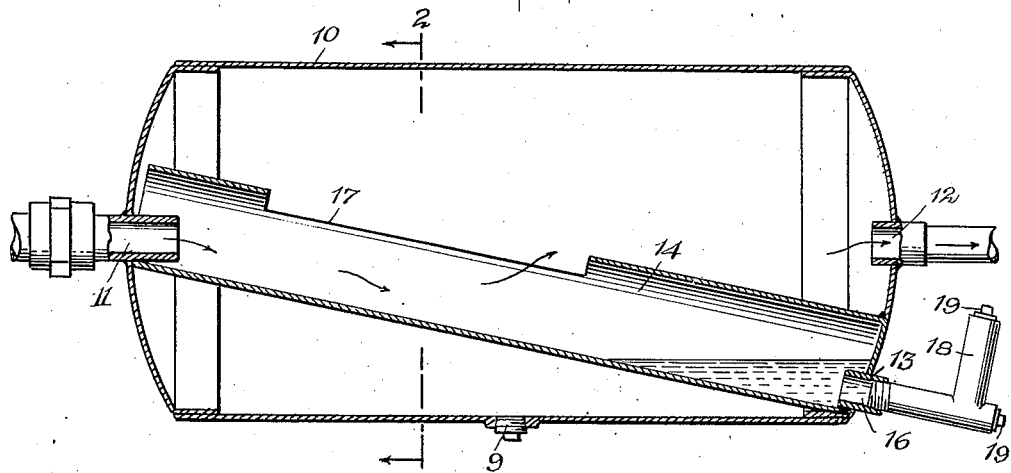
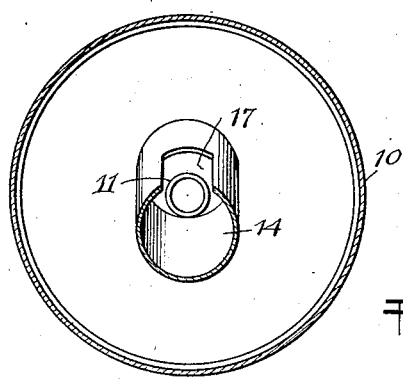
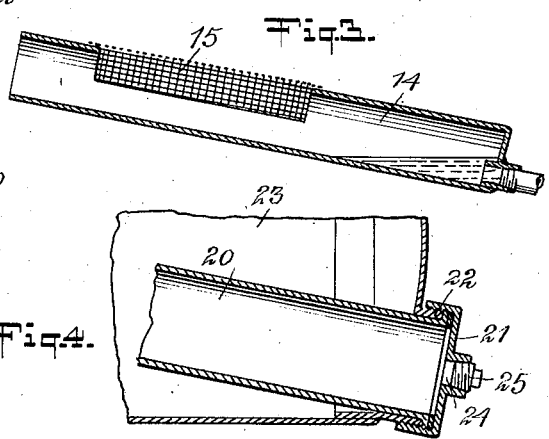
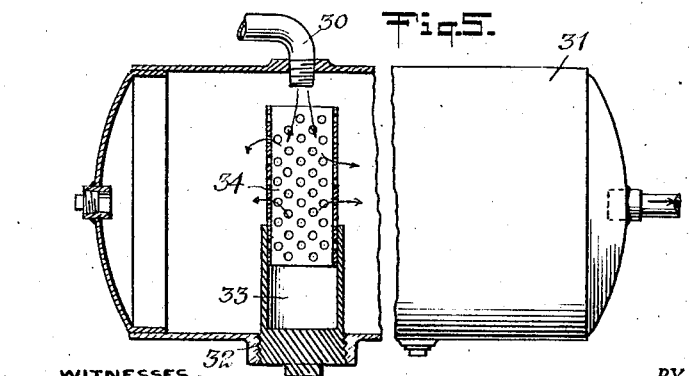
INVENTOR.
Max Dach
BY
ATTORNEYS
WITNESSES Patented July 29, 1947

2,424,879

UNITED STATES PATENT OFFICE 2,424,879

AIR TANK

Max Dach, Flushing, N. Y.

Application August 5, 1944, Serial No. 548,274

7 Claims. (Cl. 183—75)

The present invention relates to compressed air tanks for use in motor coaches, railroad trains and elsewhere where compressed air tanks are used.

One of the objects of the invention is to provide a combination compressed air tank, sludge trap and alcohol retainer.

Another object is to provide a compressed air tank which carries within itself the means to separate the water droplets, sludge and carbon particles from the compressed air and to collect said impurities.

A further object is the provision of a compressed air tank which receives unclean compressed air from the compressor and delivers clean compressed air.

Still another object is the provision of a water and foreign matter trap for use in compressed air tanks.

A still further object is the provision of a readily removable water and dirt trap for use in compressed air tanks.

Still another object is the provision of a combination water and dirt trap and alcohol retainer for use in compressed air tanks.

A still further object is to provide the means of blowing accumulated water and foreign matter out of a compressed air tank.

These and other objects are attained by mechanism illustrated in the accompanying drawing in which Figure 1 is a longitudinal, vertical section of the device;

Figure 2 is a section on the line 2—2 of Figure 1;

Figure 3 is a longitudinal, vertical section of the trap member of the device showing how a screen fits into the outlet opening thereof;

Figure 4 is a fragmentary, longitudinal, vertical section of a modified form of the trap member; and Figure 5 is a partly elevational, partly sectional view of the device, showing another modification of the trap member.

The present invention consists of a compressed air tank having an inlet opening and an outlet opening and a secondary outlet opening formed therein, a trap for water and foreign matter situated within said tank, said trap comprising a vessel having an opening at its upper end, one or more openings in its side wall and either an opening in its lower end which carries a removable plug, or no opening at all in said lower end, the vessel communicating through its upper opening with the tank inlet and through its side opening or openings with the inside of the tank, the lower end of the vessel being disposed within the secondary outlet of the tank, said vessel being adapted to hold an anti-freeze agent.

Referring to Figure 1, the tank 10 has an inlet pipe 11 which is coupled to a pipe communicating with a source of compressed air such as an air pump (not shown). It also has an outlet pipe 12 which communicates with compressed air brakes, compressed air operated doors, compressed air motors, etc. None of these last mentioned devices is shown.

Near the bottom of the tank, diagonally opposite the inlet pipe 11 is a secondary outlet 13. On the bottom of the tank is a removable plug 9 which may be used for draining purposes.

The trap 14 is a pipe which is open at its upper end and closed at its lower end except for a small opening in which is situated a short length of pipe 16. The pipe communicates through its upper opening with the tank inlet pipe 11. Its lower end is disposed within the secondary outlet 13 of the tank. As shown in Figure 1 the pipe assumes a diagonal position within the tank, being welded thereto by means of welds at the upper and lower ends of the pipe. A slot 17 formed in the upper portion of the side wall of the pipe enables the pipe to communicate therethrough with the inside of the tank. As shown in Figure 3, a screen 15 may be fixed to said pipe, covering said slot.

As appears in Figure 1, a T or L shaped pipe 18 is screwed into pipe 16, its leg pointing upwardly. The free upper and lower ends of said pipe are closed by means of plugs 19. The upper free end is used as an inlet for alcohol or other anti-freeze solution for introduction into the trap. The lower free end is used as an outlet for the deposits of foreign matter and for the accumulations of water which are collected in the trap.

In Figure 4 a modified form of the trap member is shown. Pipe 20 has a removable lower end member comprising a screw cap 21 which is screwed on to pipe 20 and also on to externally threaded flange 22 of tank 23. This cap is provided with an internally threaded port 24 which receives an externally threaded plug 25.

In Figure 5 the inlet pipe 30 enters the tank 31 at the top. The secondary outlet 32 which is an apertured opening, is formed in the bottom of the tank, directly below the inlet pipe. Screwed into outlet 32 is a pipe 33 having a closed lower end. Fixed in pipe 33 as by welding, and projecting upwardly therefrom, is a perforated pipe 34. The top end of said perforated pipe is situated immediately below the inlet pipe 30. Pipes 33 and 34 comprise the trap.

The device operates as follows:

Compressed air enters the trap through the inlet pipe. The particles of foreign matter and droplets of water brought in with said compressed air are deposited in said trap and are collected there for future removal through the secondary outlet. The clean air passes into the tank proper through slot 15 in Figure 1 and through the apertures in the perforated pipe 34 in Figure 5. It then leaves the tank through the outlet pipe in the usual way. To prevent freezing of the water collected in the trap in cold weather, alcohol or other anti-freeze agent is is introduced into the trap through the secondary outlet. The alcohol also prevents freezing of the mechanism which the compressed air actuates since it vaporizes in the tank and carries through the air lines with the compressed air.

Many modifications may be incorporated into this device without departing from the broad principles thereof. Thus, a single pipe may serve as substitute for the two pipes 33 and 34 shown in Figure 5. It would be necessary only to perforate the upper portion of said pipe.

Any suitably formed vessel or receptacle having the necessary inlet and outlet facilities may be used in place of the pipe or pipes which constitute the trap herein shown and described.

I claim:

1. In combination with a compressed air tank having an inlet and two outlet openings, a trap for water and foreign matter, said trap comprising a vessel carried within said tank, the lower end of said vessel extending through one of said outlet openings, the upper end of said vessel having an opening therein in communication with the inlet of said tank, the side of said vessel having at least one opening therein in communication with the inside of the tank, the lower end of said vessel having an opening therein, and removable means to close said opening.

2. In combination with a compressed air tank having an inlet and two outlet openings, a trap for water and foreign matter, said trap comprising a pipe carried within said tank, its lower end positioned at one of said outlet openings, an open upper end communicating with the said tank inlet opening, and an opening in the side wall communicating with the inside of said tank, the lower end of said trap communicating with the outside of the tanks by means of a pipe attachment through which water and foreign matter accumulations in said trap may be removed, and through which anti-freeze agents may be introduced into said trap, said pipe attachment having means for normally closing the same.

3. A trap in accordance with claim 2 whose lower, outwardly extending end has an inverted T shaped pipe affixed thereto, the free ends of said T-shaped pipe having removable plugs screwed therein.

4. A trap in accordance with claim 2 whose side opening is covered by means of a screen.

5. In combination with a compressed air tank having an inlet and two outlet openings, a trap for water and foreign matter, said trap comprising a vessel carried within said tank, the lower end of said vessel extending through one of said outlet openings, the upper end of said vessel having an opening therein in communication with the inlet of said tank, the side of said vessel having at least one opening therein in communication with the inside of the tank, said lower end of the vessel having an apertured cap screwed thereto, said cap having a removable block screwed into the aperture.

6. In combination with a compressed air tank having an inlet and two outlet openings, a trap for water and foreign matter, said trap comprising a vertically disposed pipe having an open top end and a closed bottom end, and an open-ended perforated pipe affixed in said open top end, said perforated pipe being in communication through its top end with the tank inlet opening and through its bottom end with the vertically disposed pipe, said vertically disposed pipe being removably screwed into one of the said tank outlet openings.

7. In combination with a compressed air tank having inlet and outlet openings of which one outlet opening is located at the bottom of said tank, a trap for water and foreign matter, said trap comprising a vessel carried within said tank, the lower end of said vessel being positioned at the bottom outlet opening of said tank through which said vessel is accessible from the outside of the tank for the removal therefrom of the water and foreign matter collected therein and for the introduction into said vessel of anti-freeze agents, said vessel having an opening at its upper end which communicated directly with the tank inlet opening to receive substantially the entire flow therefrom, and at least one opening in its side which communicates with the inside of the tank.

MAX DACH.

REFERENCES CITED

The following references are of record in the file of this patent:

UNITED STATES PATENTS

| Number | Name | Date |
|---|---|---|
| 570,790 | Gaiennie | Nov. 3, 1896 |
| 835,244 | Jeffreys | Nov. 6, 1906 |
| 1,452,447 | Thatcher | Apr. 17, 1923 |
| 1,925,373 | Davies | Sept. 5, 1933 |
| 2,223,652 | White | Dec. 3, 1940 |

FOREIGN PATENTS

| Number | Country | Date |
|---|---|---|
| 4,330 | Great Britain | Mar. 2, 1905 |